United States Patent
Frederiksen et al.

(10) Patent No.: US 8,711,671 B2
(45) Date of Patent: Apr. 29, 2014

(54) EXTENSION OF PHYSICAL DOWNLINK CONTROL CHANNEL COVERAGE

(75) Inventors: Frank Frederiksen, Klarup (DK); Sabine Roessel, München (DE); Jeroen Wigard, Klarup (DK); Martin Goldberg, Greifenberg (JP); Jijun Luo, Munich (DE); Ulrich Rehfuess, München (DE)

(73) Assignee: Nokia Siemens Networks Oy, Espoo (FI)

( * ) Notice: Subject to any disclaimer, the term of this patent is extended or adjusted under 35 U.S.C. 154(b) by 72 days.

(21) Appl. No.: 13/382,055

(22) PCT Filed: Jul. 3, 2009

(86) PCT No.: PCT/EP2009/058462
§ 371 (c)(1),
(2), (4) Date: Mar. 12, 2012

(87) PCT Pub. No.: WO2011/000440
PCT Pub. Date: Jan. 6, 2011

(65) Prior Publication Data
US 2012/0163437 A1    Jun. 28, 2012

(51) Int. Cl.
*H04J 1/00*    (2006.01)

(52) U.S. Cl.
USPC ............................................ 370/203; 370/208

(58) Field of Classification Search
USPC ........................................ 370/203, 208, 349
See application file for complete search history.

(56) References Cited

U.S. PATENT DOCUMENTS

| | | | |
|---|---|---|---|
| 8,359,039 B2 * | 1/2013 | McBeath et al. | 455/450 |
| 8,401,542 B2 * | 3/2013 | Chung et al. | 455/423 |
| 2009/0088148 A1 | 4/2009 | Chung et al. | 455/423 |
| 2011/0075624 A1 * | 3/2011 | Papasakellariou et al. | 370/329 |
| 2012/0294248 A1 * | 11/2012 | Seo et al. | 370/329 |
| 2013/0003604 A1 * | 1/2013 | Blankenship et al. | 370/255 |

FOREIGN PATENT DOCUMENTS

EP    1 990 926 A1    11/2008
WO    WO 2009/082332 A1    7/2009

OTHER PUBLICATIONS

3GPP TS 36.213 V8.7.0 (May 2009), "$3^{rd}$ Generation Partnership Project; Technical Specification Group Radio Access network; Evolved Universal Terrestrial Radio Access (E-UTRA); Physical layer procedures (Release 8)", 77 pgs.
3GPP TS 36.104 V8.5.0 (Mar. 2009), "$3^{rd}$ Generation Partnership Project; Technical specification Group Radio Access Network; Evolved Universal Terrestrial Radio Access (E-UTRA); Base Station (BS) radio transmission and reception (Release 8)", 74 pgs.
Love et al., "Downlink Control Channel Design for 3GPP LTE", (2008), (pp. 813-818).

* cited by examiner

*Primary Examiner* — Brenda H Pham
(74) *Attorney, Agent, or Firm* — Harrington & Smith (57) ABSTRACT

It is provided an apparatus, including observing means configured to observe a first parameter; deciding means configured to decide, based on the first parameter, whether or not an original search space of a downlink control channel of an orthogonal frequency division multiplex technology is to be redefined; and redefining means configured to redefine the original search space, thus obtaining a redefined search space.

20 Claims, 4 Drawing Sheets

EXTENSION OF PHYSICAL DOWNLINK CONTROL CHANNEL COVERAGE

FIELD OF THE INVENTION

The present invention relates to an apparatus, a method, a system, and a computer program product for enhancing the coverage of a physical downlink control channel.

BACKGROUND OF THE INVENTION

The 3GPP standard Long-Term-Evolution (LTE) of UTRAN is a system using orthogonal frequency division multiplex (OFDM) standards with frequency-localized allocations.

In the LTE system one main difference to earlier 3GPP releases is the use of wide channels that are shared with users in frequency domain (i.e., frequency division multiplexing). Allocation for one user can vary from one physical resource block (PRB) to maximum number of resource blocks in the channel (e.g. 50 PRB for 10 MHz channel). A physical resource block is the smallest allocable frequency range of the uplink or downlink frequency band lasting a predefined time. E.g., in LTE, a physical resource block is 180 kHz wide and lasts for a 0.5 ms time slot (transmission time interval, TTI).

It is common understanding in the industry that LTE—in the long run—will completely substitute incumbent radio access technologies including Code Division Multiplex Access (CDMA), Wideband CDMA (W-CDMA), and Global System for Mobile communication (GSM)/Enhanced Data rate for GSM Evolution (EDGE) where spectrum allocations and regulatory rules will allow for.

It is therefore of vital interest to operators, that migration e.g. from CDMA or from W-CDMA to LTE is possible without the need for further increasing the number of Base Station sites or the amount or size of antenna configurations.

Hence, for the same traffic profile and demand, LTE link budgets shall match those of CDMA or W-CDMA. Further, LTE link budgets matching conventional traffic profiles and demand must also match LTE link budgets for new applications like down streaming or heavy downloading.

The LTE downlink (DL) link budget is critical for the Physical Downlink Shared Channel (PDSCH) with high data rate services like video or multi-media streaming (e.g. ½ Mbps at the cell edge), and for low data rate services like VoIP (e.g. 5.9 Kbps or 12.2/12.8 Kbps) at the cell edge.

The communication link between an evolved NodeB (eNB) and an user equipment (UE) is created through a set of channels. For downlink communication, the UE is notified of an incoming data packet through the physical downlink control channel (PDCCH), and the user payload is carried on the physical downlink shared channel (PDSCH), which can be used to carry traffic to multiple UEs (frequency multiplexed) within the same transmit time interval (TTI).

Similarly, uplink traffic will also be scheduled through the PDCCH (but with an uplink grant), and the physical uplink shared channel (PUSCH) will be used for the transmission of the data from the UE to the eNB.

One issue that has been observed when comparing the LTE system to the WCDMA system is the fact that LTE is lacking some power adjustment flexibility in terms of providing all the system power to a single UE with low data rates. For WCDMA/HSDPA, it is possible to have a single user using all the transmit power, while this is not possible for LTE release 8 for relative small user payloads.

Several methods have been proposed to enhance the PDSCH coverage. For example, for a critical UE/service, as many physical resource blocks (PRB) as possible for a given transport block and an as robust modulation and coding scheme (MCS) may be allocated. Alternatively, some energy may be "borrowed" from PRBs that are using less than the nominal eNB TX power or are not used at all (see 3GPP TS 36.104 v8.5.0, section 6.3.1.1).

Current mechanisms for adapting the performance of the PDCCH are providing power and coding control of the PDCCH. This is achieved through (1) aggregation of the control channel elements (CCEs), and (2) power boosting of the PDCCH (by shifting power from unused CCEs to CCEs used for poor coverage UEs).

One problem of the first approach is that the maximum "legal" number of CCEs to aggregate for a PDCCH will be 8, which is currently well balanced to the current performance of the standard Rel'8 PDSCH. Further, power boosting may be used, but according to 3GPP hardware specifications (to reduce the power leakage to other frequencies), it is only allowed to boost the transmit power by 4 dB (a bit more than a factor of 2).

Therefore, there does not seem to be a balance between the extension methods of the PDSCH and the PDCCH.

SUMMARY OF THE INVENTION

It is an object of the present invention to improve the prior art.

According to a first aspect of the invention, there is provided an apparatus comprising observing means configured to observe a first parameter; deciding means configured to decide, based on the first parameter, whether or not an original search space of a downlink control channel of an orthogonal frequency division multiplex technology is to be redefined; and redefining means configured to redefine the original search space, thus obtaining a redefined search space.

Modifications of the First Aspect are as Follows:

The apparatus may comprise transmitting means configured to transmit an information about the redefinition of the original search space.

The apparatus may comprise a transmitting means which is configured to transmit the information via radio resource control signaling.

In the apparatus, the transmitting means may be configured to transmit the first parameter, and wherein the first parameter may be a parameter controlling a coverage for the downlink shared channel information.

In the apparatus, the redefining means may be configured to remove a search position from the original search space.

In the apparatus, the redefining means may be configured to add a search position to the original search space.

In the apparatus, the aggregation level of the added search position may be defined as m*4, m being a positive integer, including the aggregation levels of 16, 24, and 32.

In the apparatus, the redefining means may be configured to add at least two search positions having the same aggregation level, the apparatus may further comprise writing means configured to write a specific entry into each of the at least two search positions.

In the apparatus, both, the original search space and the redefined search space, may be a user equipment specific search space or a common search space.

Furthermore, it is provided a base station, which may comprise an apparatus according to the first aspect, and a base station means which may be configured to provide a base station functionality according to the orthogonal frequency division multiplexing technique.

According to a second aspect of the invention, it is provided an apparatus comprising monitoring means configured to monitor a first parameter comprising an information if an original search space of a downlink control channel of an orthogonal frequency division multiplex technology is redefined, checking means configured to check whether or not the first parameter indicates the original search space is redefined; and searching means configured to search an entry at a search entry of the redefined search space.

Modifications of the Second Aspect are as Follows:

The apparatus may further comprise receiving means configured to receive the first parameter.

In the apparatus, the receiving means may be configured to receive the first parameter via radio resource control signaling.

In the apparatus, the receiving means may be configured to receive the first parameter, wherein the first parameter may be a parameter controlling a coverage for the downlink shared channel information.

In the apparatus, the searching means may be configured not to search at a search position of the original search space.

In the apparatus, the searching means may be configured to search at a search position not comprised in the original search space.

In the apparatus, the aggregation level of the search position not comprised in the original search space may be defined as m*4, m being a positive integer, including the aggregation levels of 16, 24, and 32.

In the apparatus, the searching means may be configured to search at least two search positions having the same aggregation level, the apparatus may further comprise combining means configured to combine the entries of the at least two search positions.

In the apparatus, both, the original search space and the redefined search space, may be a user equipment specific search space or a common search space.

Furthermore, it is provided user equipment which may comprise an apparatus according to the second aspect, and a user equipment means which may be configured to provide a user equipment functionality according to the orthogonal frequency division multiplexing technique.

According to a third aspect of the invention, a method is provided comprising observing a first parameter; deciding, based on the first parameter, whether or not an original search space of a downlink control channel of an orthogonal frequency division multiplex technology is to be redefined; and redefining the original search space, thus obtaining a redefined search space, if it is decided that the original search space is to be redefined.

Modifications of the Third Aspect are as Follows:

The method may further comprise transmitting an information about the redefinition of the original search space.

In the method, the information may be transmitted via radio resource control signaling.

In the method, the first parameter may be transmitted, wherein the first parameter may be a parameter controlling a coverage for the downlink shared channel information.

In the method, the redefining may comprise removing a search position from the original search space.

In the method, the redefining may comprise adding a search position to the original search space.

In the method, the aggregation level of the added search position may be defined as m*4, m being a positive integer, including the aggregation levels of 16, 24, and 32.

In the method, the redefining may comprise adding at least two search positions having the same aggregation level, the method may further comprise writing a specific entry into each of the at least two search positions.

In the method, both, the original search space and the redefined search space, may be a user equipment specific search space or a common search space.

The method may be a method of extending the downlink control channel coverage.

According to a fourth aspect of the invention, it is provided a method comprising monitoring a first parameter comprising an information if an original search space of a downlink control channel of an orthogonal frequency division multiplex technology is redefined; checking whether or not the first parameter indicates that the original search space is redefined; searching an entry at a search entry of the redefined search space if the checking means checks that the original search space is redefined.

Modifications of the Fourth Aspect are as Follows:

The method may further comprise receiving the first parameter.

In the method, the receiving may comprise receiving the first parameter via radio resource control signaling.

In the method, the receiving may comprise receiving the first parameter, wherein the first parameter may be a parameter controlling a coverage for the downlink shared channel information.

In the method, the searching may comprise not to search at a search position of the original search space.

In the method, the searching may comprise searching at a search position not comprised in the original search space.

In the method, the aggregation level of the search position not comprised in the original search space may be defined as m*4, m being a positive integer, including the aggregation levels of 16, 24, and 32.

In the method, the searching may comprise searching at least two search positions having the same aggregation level, the method may further comprise combining the entries of the at least two search positions.

In the method, both, the original search space and the redefined search space, may be a user equipment specific search space or a common search space.

The method may be a method of extending the downlink control channel coverage.

According to a fifth aspect of the invention, it is provided a computer program product embodied on a computer-readable medium, comprising program instructions which perform, when run on a computer, the execution of which result in operations of the method according to any of claims third or fourth aspect.

According to a sixth aspect of the present invention, it is provided a system which may comprise an apparatus according to the first aspect, wherein the transmitting means is configured to transmit to an apparatus comprising a receiving means according to the second aspect.

According to a seventh aspect of the invention, it is provided an apparatus comprising an observer configured to observe a first parameter; a decider configured to decide, based on the first parameter, whether or not an original search space of a downlink control channel of an orthogonal frequency division multiplex technology is to be redefined; and a redefiner configured to redefine the original search space, thus obtaining a redefined search space.

Modifications of the Seventh Aspect are as Follows:

The apparatus may comprise a transmitter configured to transmit an information about the redefinition of the original search space.

The apparatus may comprise a transmitter which is configured to transmit the information via radio resource control signaling.

In the apparatus, the transmitter may be configured to transmit the first parameter, and wherein the first parameter may be a parameter controlling a coverage for the downlink shared channel information.

In the apparatus, the redefiner may be configured to remove a search position from the original search space.

In the apparatus, the redefiner may be configured to add a search position to the original search space.

In the apparatus, the aggregation level of the added search position may be defined as m*4, m being a positive integer, including the aggregation levels of 16, 24, and 32.

In the apparatus, the redefiner may be configured to add at least two search positions having the same aggregation level, the apparatus may further comprise a writer configured to write a specific entry into each of the at least two search positions.

In the apparatus, both, the original search space and the redefined search space, may be a user equipment specific search space or a common search space.

Furthermore, it is provided a base station, which may comprise an apparatus according to the seventh aspect, and a base station processor which may be configured to provide a base station functionality according to the orthogonal frequency division multiplexing technique.

According to an eighth aspect of the invention, it is provided an apparatus comprising a monitor configured to monitor a first parameter comprising an information if an original search space of a downlink control channel of an orthogonal frequency division multiplex technology is redefined, a checker configured to check whether or not the first parameter indicates the original search space is redefined; and a searcher configured to search an entry at a search entry of the redefined search space.

Modifications of the Eighth Aspect are as Follows:

The apparatus may further comprise a receiver configured to receive the first parameter.

In the apparatus, the receiver may be configured to receive the first parameter via radio resource control signaling.

In the apparatus, the receiver may be configured to receive the first parameter, wherein the first parameter may be a parameter controlling a coverage for the downlink shared channel information.

In the apparatus, the searcher may be configured not to search at a search position of the original search space.

In the apparatus, the searcher may be configured to search at a search position not comprised in the original search space.

In the apparatus, the aggregation level of the search position not comprised in the original search space may be defined as m*4, m being a positive integer, including the aggregation levels of 16, 24, and 32.

In the apparatus, the searcher may be configured to search at least two search positions having the same aggregation level, the apparatus may further comprise combining means configured to combine the entries of the at least two search positions.

In the apparatus, both, the original search space and the redefined search space, may be a user equipment specific search space or a common search space.

Furthermore, it is provided user equipment which may comprise an apparatus according to the eighth aspect, and a user equipment processor which may be configured to provide a user equipment functionality according to the orthogonal frequency division multiplexing technique.

It is to be understood that any of the above modifications can be applied individually or in combination to the respective aspects to which they refer, unless they are explicitly stated as excluding alternatives.

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

The present application focuses on enhancing the DL link coverage of the Physical Downlink Control Channel (PDSCH).

It is disclosed a coverage extension method for the LTE Physical Downlink Control Channel (PDCCH). It may be used in order to catch up with proposed coverage extensions of the Physical Downlink Shared Channel (PDSCH).

According to LTE, PDCCH is the downlink control channel, which carries the information about the structure and allocation of the shared traffic channels in UL and DL (PDSCH, PUSCH), i.e. the PDCCH contains the UL and DL grants for physical resource block (PRB) allocation, modulation and coding scheme (MCS) selection as well as power control commands, etc. which are to be submitted e.g. by an evolved NodeB to scheduled UEs in a certain TTI. In addition, the PDCCH also covers signaling allocation such as e.g. broadcast, paging and random access response messages. Efficient utilization of the PDCCH is a key for good LTE system performance and high capacity.

Specifically, an eNodeB as the LTE base station has to signal on the PDCCH per TTI to all scheduled UEs the corresponding allocation for UL and DL. In addition, also broadcast, paging and other common signaling is transmitted. In order to comply with these tasks, the PDCCH is partitioned into a common search space (CSS) and a UE specific search space (USS). Every active UE, including idle mode UEs, which have to listen occasionally for broadcast information like paging, in the cell listens to the PDCCH (excluding the configured discontinuous reception (DRX) periods). Though, a UE listens only on specific search positions according to its hashing function, which relies on a Radio Network Temporary Identifier (RNTI) and a sub frame number and the aggregation selected for the message. An aggregation defines the code-rate selected for the message, which is derived from Channel Quality Indicator (CQI)/radio quality measurements such that typically a target of 1% block error rate (BLER) as a TARGET_BLER is maintained.

The higher the aggregation, the lower is the number of potential search positions on the PDCCH. For example, depending on the DCI format, aggregation levels and coding may be linked as follows: aggregation level 1 (coding QPSK-2/3), aggregation level 2 (coding QPSK 1/3), aggregation level 4 (coding QPSK-1/6), and aggregation level 8 (coding QPSK-1/12) (QPSK: Quadrature Phase Shift Keying) possible with six potential search positions of PDCCH candidates, six potential search positions, two potential search positions, and two potential search positions, respectively, on PDCCH available (see table 1, adapted from 3GPP TS 36.213, section 9.1.1).

TABLE 1

PDCCH candidates monitored by a UE.

| Type | Search space $S_k^{(L)}$ | | Number of | |
|---|---|---|---|---|
| | Aggregation level L | Size [in CCEs] | PDCCH candidates $M^{(L)}$ | Example Coding |
| UE-specific | 1 | 6 | 6 | QPSK-$\frac{2}{3}$ |
| | 2 | 12 | 6 | QPSK $\frac{1}{3}$ |
| | 4 | 8 | 2 | QPSK-$\frac{1}{6}$ |
| | 8 | 16 | 2 | QPSK-$\frac{1}{12}$ |
| Common | 4 | 16 | 4 | QPSK-$\frac{1}{6}$ |
| | 8 | 16 | 2 | QPSK-$\frac{1}{12}$ |

According to embodiments of the invention the search spaces used for the UEs being in "coverage extension mode" are rearranged. "Coverage extension mode" means that the downlink link budget of the PDSCH is estimated to be exhausted, and the PDSCH coverage must be further extended. This may be achieved e.g. by "energy borrowing" from PRBs that are using less than the nominal eNB TX power or are not used at all (see 3GPP TS 36.104 v8.5.0, section 6.3.1.1). The UE may be informed about "energy borrowing".

An example of a link budget being exhausted is the following: If a minimum data rate is guaranteed for a service on one side, and on the other side the downlink scheduler would like to reduce the data rate below the guaranteed data rate because of poor radio conditions, the link is exhausted. Exhaustion may e.g. also occur for "best effort" services without a guaranteed data rate when the UE is at or beyond the coverage area.

As another option for extending the PDSCH coverage, power boosting in the frequency domain by using the rate matcher to allow for collecting energy from additional PRBs may be applied, thereby supporting extremely low coding rates for the PDSCH. In detail, the maximum number of bits per transport block may be reduced by a scaling factor, exemplarily named "DL_TBS_scaling_factor", having preferably values of 1, 2, 4, and 8. The proposed scaling factor should usually only be larger than 1 for UEs in really poor conditions, as it results in a limitation of the maximum possible throughput. Preferably, the scaling parameter would be signaled through radio resource control (RRC) to the UE, thus, it would be relatively simple to move the UE back to normal operation whenever the propagation conditions were more "normal".

Therefore, usage of energy borrowing as well as a DL_TBS_scaling_factor larger than 1 are, indicators that the PDSCH coverage is extended for a certain UE, and that a corresponding extension of the PDCCH coverage may be required. The UE may be informed about these indicators explicitly, e.g. via RRC or physical layer signaling, or implicitly, e.g. through path loss estimations.

The coverage may be extended by introducing one or more entries in the common search space. The common search space (CSS) is preferable because information relevant for all UEs is transmitted in the CSS. The information is transmitted as downlink control information (DCI), e.g. system information (masked by SI-RNTI), paging (masked by P-RNTI), and transmit power control (masked by TPC-RNTI) (RNTI: radio network temporary identifier).

The additional entry comprises two or more entries of the highest aggregation level, i.e. aggregation level 8 for LTE release 8. The entries may be concatenated.

Figure 1:
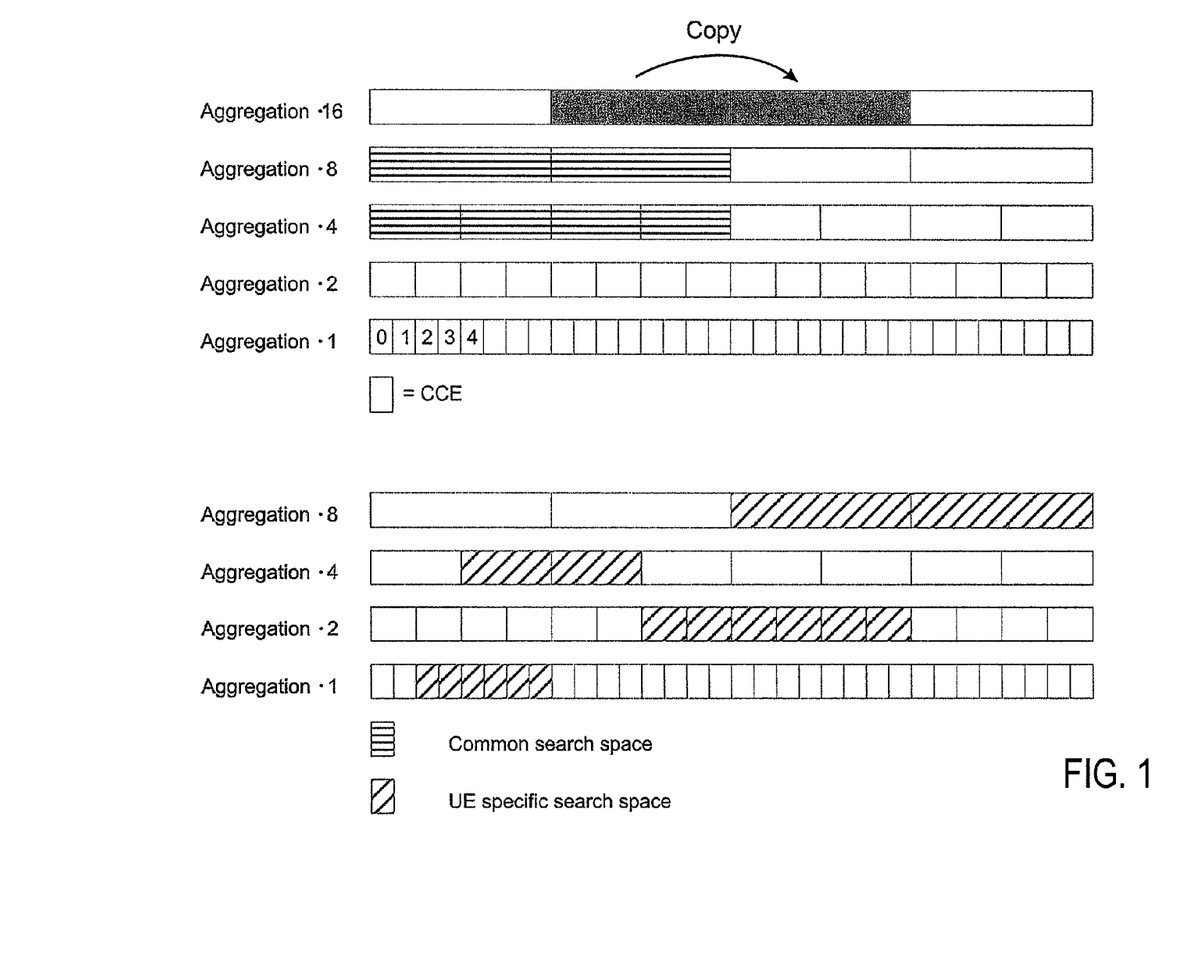
FIG. 1 shows a common search space and a UE specific search space according to an embodiment of the invention.

FIG. 1 shows the principle according to an embodiment with two entries. FIG. 1 shows the organisation of the common search space (top) and the UE specific search space (bottom). The search space is based on control channel elements (CCEs).

In the user UE specific search space, 6 CCEs (in the embodiment CCEs No. 2-7) are allocated to aggregation level 1. I.e., a DCI message may be comprised in any of these 6 CCEs (PDCCH candidates). Therefore, per DCI format, 6 blind decoding attempts are required for aggregation level 1.

For aggregation level 2, 12 CCEs (in the embodiment CCEs No. 12-23) are allocated to aggregation level 2. I.e, a DCI message may be comprised in any of the 6 pairs ((12, 13), (14, 15), etc.) of CCEs. Each such pair is a PDCCH candidate of size 2 CCEs. Therefore, per DCI format, 6 blind decoding attempts are required for aggregation level 2.

Correspondingly, for aggregation level 4, 8 CCEs are allocated, resulting in 2 blind coding attempts, and for aggregation level 8, 16 CCEs are allocated, resulting in 2 blind coding attempts per DCI format In blind decoding, the UE performs rate matching corresponding to each of the DCI formats to decode the resulting sequence, and check the CRC that is masked with a corresponding radio network temporary identifier (RNTI).

In the common search space (top of FIG. 1), according to LTE release 8, aggregation levels 1 and 2 are not used. For aggregation level 4 and 8, 16 CCEs are allocated, resulting in 4 and 2 blind decoding attempts, respectively.

According to an embodiment of the invention, "aggregation level 16" is added to the common search space. In aggregation level 16 2 PDCCH candidates, each of 8 CCEs, are allocated. I.e., each PDCCH candidate has the same size as a PDCCH candidate of the highest aggregation level corresponding to the lowest coding according to LTE release 8.

In aggregation level 16, the same entry is repeated in both PDCCH candidates.

For transmission, a PDCCH candidate of aggregation level 16 is encoded with the same coding as a PDCCH candidate of aggregation level 8 which is the lowest coding because this low coding is usually robust enough. Alternatively, an even lower coding may be used for the newly introduced aggregation level.

The UE is informed about its PDSCH extended coverage mode as outlined above. In some embodiments, a PDSCH extended coverage mode is connected with the assignment of aggregation level 16. Therefore, the UE is informed about assignment of aggregation level 16 together with the information about the PDSCH extended coverage mode.

In other embodiments, the eNB may separately inform the UE about the assignment of aggregation level 16, e.g. using radio resource control (RRC).

Upon receipt of the PDCCH, the UE of an embodiment combines the two PDCCH candidates of aggregation level 16. Thus, similar to a diversity gain, there is a theoretical gain of 3 dB at the UE receiver. Then, the UE decodes the combined PDCCH candidates and evaluates the DCI as usual.

If the position of at least one of the PDCCH candidates of aggregation level 16 is equal to a position of one of the PDCCH candidates of aggregation level 8 (as shown in the embodiment of FIG. 1), existing release 8 UEs still can evaluate the PDCCH candidate of level 16.

The redefinition of the search space according to some embodiments of the invention does not introduce major additional decoding complexity for UEs under poor coverage.

Figure 2:
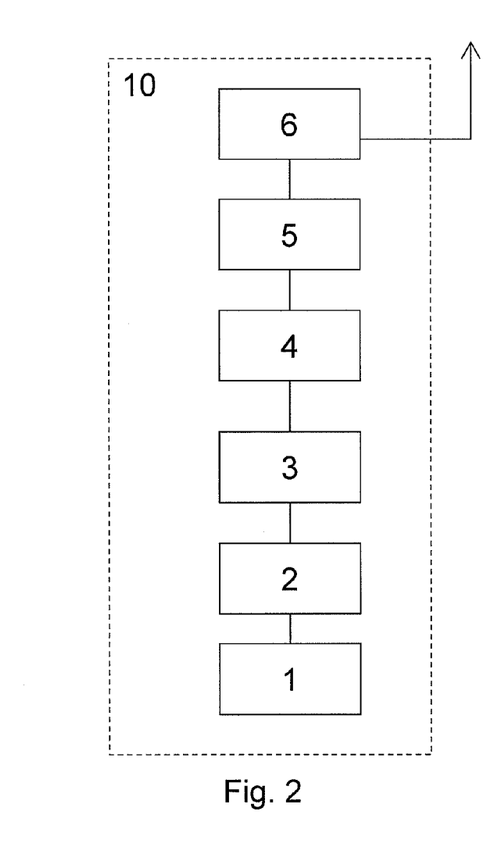
FIG. 2 shows an apparatus according to an embodiment of the invention.

FIG. 2 shows an apparatus 10 according to an embodiment of the present invention.

The apparatus 10 comprises an allocator 1, a decider 2, an assigner 3, a writer 4, an encoder 5, and a transmitter 6.

The allocator 1 allocates, according to an orthogonal frequency division multiplexing technique, a modulation and coding scheme and a maximum number of resource blocks per transport block to one of a plurality of user equipments. The decider 2 decides whether a condition that a downlink link budget corresponding to the modulation and coding scheme and the maximum number of resource blocks per transport block of the one of the plurality of user equipments is exhausted. If the condition is fulfilled, the assigner 3 assigns at least two control channel candidates in a search space of a downlink control channel to a downlink control information to be transmitted to the one of the plurality of user equipments, wherein each control channel candidate has a size equal to a smallest size of a control channel candidate with a lowest coding in the search space according to the orthogonal frequency division multiplexing technique. The writer 4 writes the downlink control information into each of the assigned control channel candidates. The encoder 5 encodes each assigned control channel candidate with the lowest coding in the search space. The transmitter 6 transmits the downlink control channel comprising the encoded assigned control channel candidates, and transmits an information about the condition, i.e. whether or not the downlink link budget is exhausted.

Figure 3:
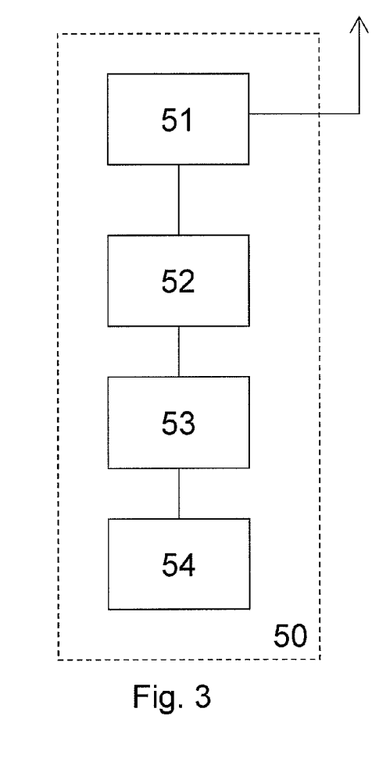
FIG. 3 shows another apparatus according to an embodiment of the invention.

FIG. 3 shows another apparatus 50 according to an embodiment of the present invention.

The apparatus 50 comprises a receiver 51, a combiner 52, a decoder 53, and a processor 54.

The receiver 51 receives a downlink control channel via an orthogonal frequency division multiplexing radio interface, and an information whether or not a certain condition is fulfilled. The combiner 52 combines, if the condition is fulfilled, at least two control channel candidates of a search space of the downlink control channel, thus obtaining a combined control channel candidate, wherein a size of each of the control channel candidates is equal to a smallest size of a control channel candidate with a lowest coding in the search space according to the orthogonal frequency division multiplexing technique. The decoder 53 decodes the combined control channel candidate using the lowest coding to obtain a downlink control information. The processor 54 processes the downlink control information according to the orthogonal frequency division multiplexing technique.

The modules shown for the two exemplary embodiments in FIGS. 2 and 3 may be separate modules, or some or all of the modules may be implemented in one module. The modules may be implemented in software, firmware, hardware, or a combination thereof.

Figure 4:
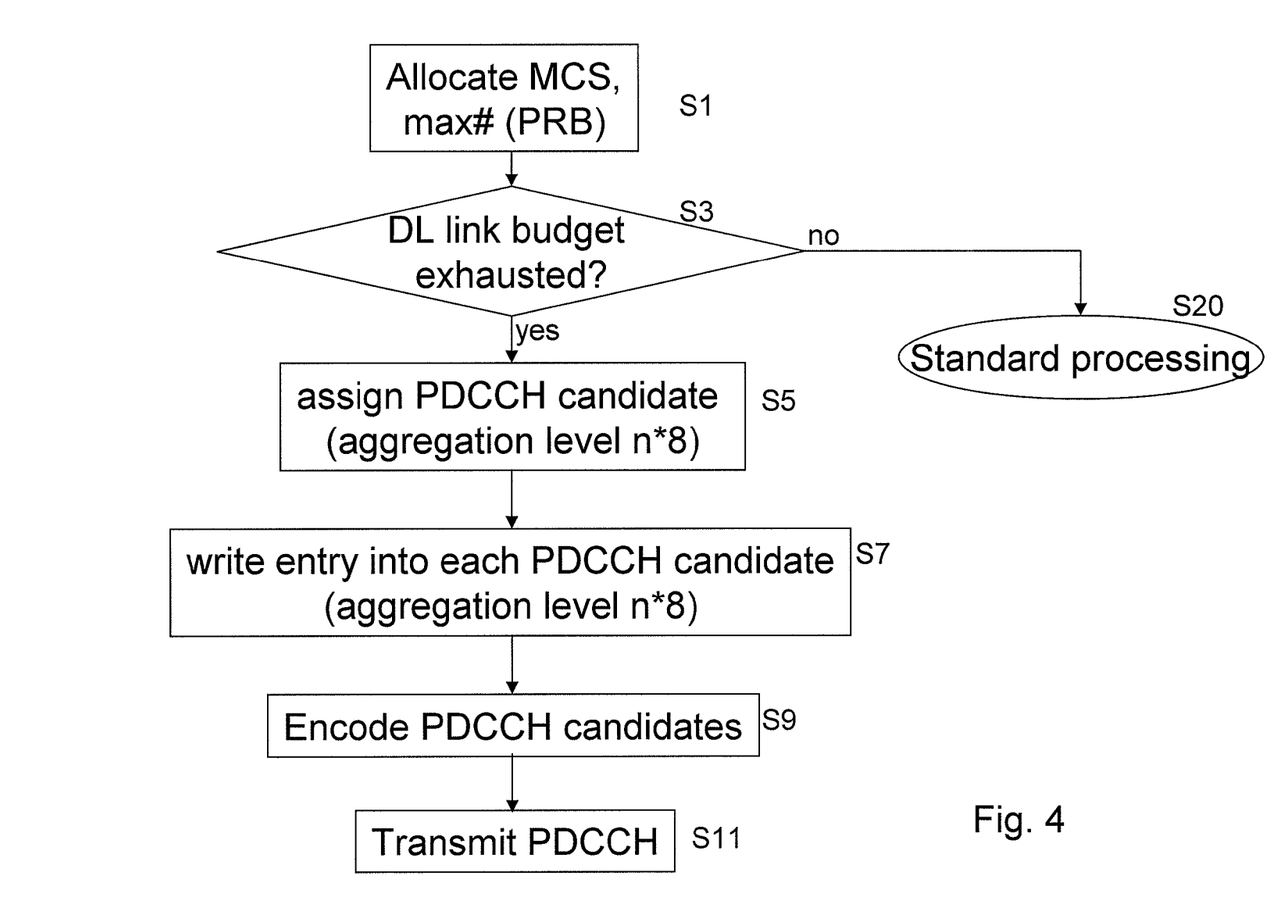
FIG. 4 shows a method according to an embodiment of the invention.

FIG. 4 shows a method according to an embodiment of the present invention that may be performed by an apparatus according to FIG. 2.

In detail, in step S1, a modulation and coding scheme and a maximum number of resource blocks per transport block according to an orthogonal frequency division multiplexing technique is allocated to one of a plurality of user equipments. In step S3 it is decided whether a condition that a downlink link budget of the one of the plurality of user equipments corresponding to the modulation and coding scheme and the maximum number of resource blocks per transport block is exhausted. If the DL link budget is not exhausted, standard processing is performed in step S20.

Otherwise, if the DL link budget is exhausted, in step S5 at least two control channel candidates in a search space of a downlink control channel are assigned to a downlink control information to be transmitted to the one of the plurality of user equipments, wherein each control channel candidate has a size equal to a smallest size of a control channel candidate with a lowest coding in the search space according to the orthogonal frequency division multiplexing technique.

In step S7, the downlink control information is written into each of the assigned control channel candidates. In step S9, each of the assigned control channel candidates is encoded with the lowest coding in the search space. E.g. in an embodiment according to table 1, QPSK-1/12 is used. In step S11, a physical downlink control channel comprising the encoded assigned control channel candidates is transmitted. In addition, either in step S11 or in a separate step (not shown) an information about the condition, i.e. whether or not the DL link budget of the UE is exhausted, is transmitted.

Figure 5:
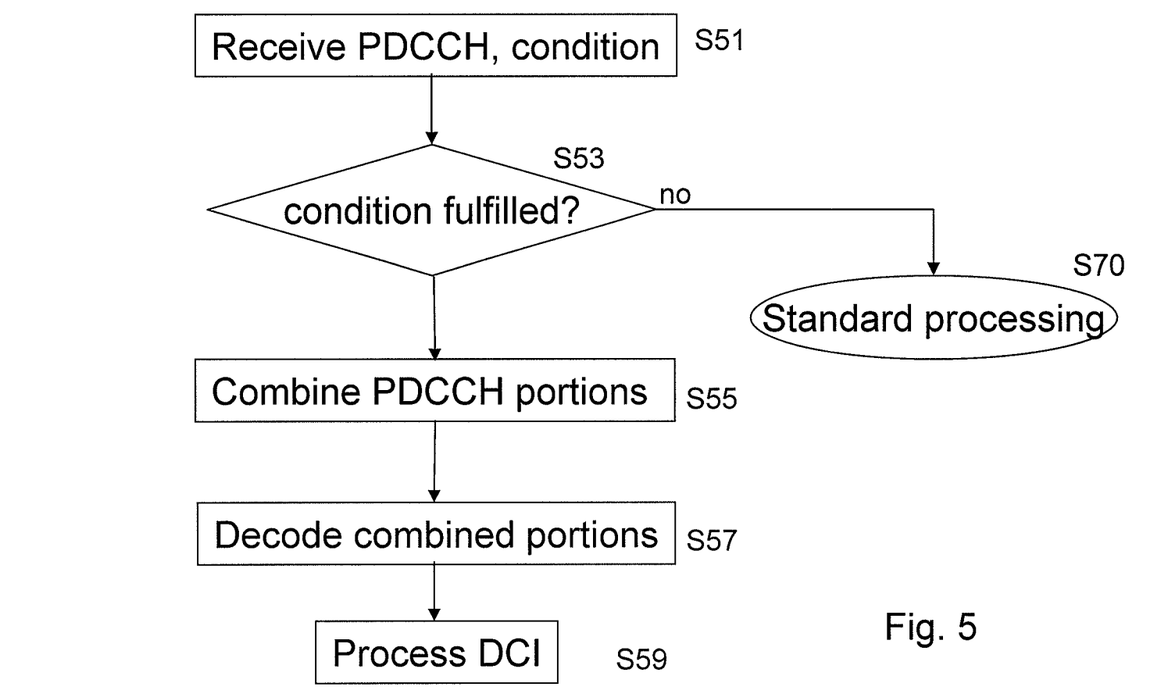
FIG. 5 shows another method according to an embodiment of the invention.

FIG. 5 shows a method according to another embodiment of the present invention that may be performed by an apparatus according to FIG. 3.

In step S51, a downlink control channel is received by a UE via an orthogonal frequency division multiplexing radio interface. Either within step S51, or in a separate step (not shown) an information about a condition is received. The condition is fulfilled if the DL link budget of the UE is exhausted.

In step S53, it is checked whether the condition is fulfilled. If the condition is not fulfilled, the method proceeds in step S70 with processing according to the OFDM standard.

Otherwise, if the condition is fulfilled, in step S55, at least two control channel candidates of a search space of the downlink control channel are combined, thus obtaining a combined control channel candidate. A size, e.g. a number of CCEs, of each of the control channel candidates is equal to a smallest size of a control channel candidate with a lowest coding in the search space according to the OFDM technique. In step S57, the combined control channel candidate is decoded using the lowest coding to obtain a downlink control information. In step S59, the downlink control information is processed according to the orthogonal frequency division multiplexing technique.

In some embodiments, the method may be applied to other OFDM-based wireless access communication techniques or standards than of E-UTRAN/LTE mobile communication.

In some embodiments, the search space for a UE may only be rearranged if the DL_TBS_scaling_factor exceeds a predefined value larger than 1, e.g., only if the scaling factor is larger than 2 or 4. This may be useful if the coverage of the PDSCH and PDCCH are still balanced for lower values of the scaling factor.

In some embodiments, aggregation levels n*8 with n≥2 may be introduced, wherein the entry of a PDCCH candidate is copied into the n PDCCH candidates of aggregation level 8

(or generally, the highest aggregation level according to the respective standard). E.g., the value of n may be the larger the larger the value of the "DL_TBS_scaling_factor" introduced above is because this correlates with the coverage condition being the poorer.

In some embodiments, aggregation levels m*4 with m≥2, preferably m≥4 based on aggregation level 4 may be introduced.

In some embodiments, the same mechanisms as described with reference to the common search space may be applied to another search space such as a UE specific search space.

According to embodiments described with respect to FIG. 1, the PDCCH candidates of aggregation level 16 are concatenated. However, in some embodiments, some or all PDCCH candidates of aggregation level n*8 or m*4 may not be concatenated but e.g. isolated in the search space. However, in any case, the PDCCH candidates must not overlap in the search space.

Instead of combining the PDCCH candidates of level 16 at the receiver, the UE in some embodiments may decode these PDCCH candidates separately. Although in this case, there is no receiver gain, the probability of receiving properly a DCI in at least one of the PDCCH candidates is higher than without repetition. The implementation of such an embodiment may be easier.

In addition, in some embodiments, higher level of aggregation in the UE specific search space may be introduced.

Below, there is described another redefinition of the search space to be performed in coverage extension mode. It is in particular useful to compensate for the additional complexity by inhibiting using aggregation level 1 in the user specific search space.

In poor coverage situations, there is a very little probability that the eNB would be using aggregation level 1 with the highest coding to address/schedule the UE. As can be seen from table 1, the UE specific search space contains 6 blind decoding attempts (for a PDCCH) at aggregation level 1, which means that a total of 12 blind decoding attempts for allocating DL resources (6 blind decoding attempts for DCI format 0, and 6 blind decoding attempts for DCI format 1A) for a downlink control information (DCI) message will happen. In some embodiments, in order to reduce the computational effort for a UE in a poor coverage situation, usage of aggregation level 1 may be completely inhibited in the UE specific search space of the UE, thus reducing the number of blind decoding attempts.

According to the above description, it should thus be apparent that exemplary embodiments of the present invention provide, for example an evolved Node B, or a component thereof, an apparatus embodying the same, a method for controlling and/or operating the same, and computer program(s) controlling and/or operating the same as well as mediums carrying such computer program(s) and forming computer program product(s).

Furthermore, it should thus be apparent that exemplary embodiments of the present invention provide, for example an user terminal, or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods, system and computer program products capable of extending the coverage of the physical downlink control channel.

In particular, it is provided an apparatus, comprising an apparatus, comprising observing means configured to observe a first parameter; deciding means configured to decide, based on the first parameter, whether or not an original search space of a downlink control channel of an orthogonal frequency division multiplex technology is to be redefined; and redefining means configured to redefine the original search space, thus obtaining a redefined search space.

Furthermore, it is provided an apparatus, comprising monitoring means configured to monitor a first parameter comprising an information if an original search space of a downlink control channel of an orthogonal frequency division multiplex technology is redefined; checking means configured to check whether or not the first parameter indicates the original search space is redefined; and searching means configured to search an entry at a search entry of the redefined search space.

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising:
one or more processors; and
one or more memories including computer program code, the one or more memories and the computer program code configured, with the one or more processors, to cause the apparatus to perform at least the following:
monitoring a first parameter comprising an information when an original search space of a downlink control channel of an orthogonal frequency division multiplex technology is redefined;
checking whether or not the first parameter indicates the original search space is redefined; and
searching an entry at a search entry of the redefined search space.

2. The apparatus according to claim 1, wherein the one or more memories and the computer program code are further configured, with the one or more processors, to cause the apparatus to perform:
receiving the first parameter.

3. The apparatus according to claim 2, wherein the receiving comprises receiving the first parameter via radio resource control signaling.

4. The apparatus according to claim 2, wherein the first parameter is a parameter controlling a coverage for the downlink shared channel information.

5. The apparatus according to claim 1, wherein the searching comprises not searching at a search position of the original search space.

6. The apparatus according to claim 1, wherein the searching comprises searching at at least one search position not comprised in the original search space.

7. The apparatus according to claim 6, wherein the aggregation level of the search position not comprised in the original search space is defined as m*4, m being a positive integer, including the aggregation levels of 16, 24, and 32.

8. The apparatus according to claim 6, wherein the searching comprises searching at least two search positions having the same aggregation level, and wherein the one or more memories and the computer program code are further configured, with the one or more processors, to cause the apparatus to perform:

combining the entries of the at least two search positions; or decoding the entries of the at least two search positions separately.

9. The apparatus according to claim 1, wherein both the original search space and the redefined search space are a user equipment specific search space or a common search space.

10. User equipment, comprising an apparatus according to claim 1, said user equipment having a user equipment functionality according to the orthogonal frequency division multiplexing technique.

11. A method comprising:

monitoring a first parameter comprising an information when an original search space of a downlink control channel of an orthogonal frequency division multiplex technology is redefined;

checking whether or not the first parameter indicates that the original search space is redefined; and searching an entry at a search entry of the redefined search space if the checking means checks that the original search space is redefined.

12. The method according to claim 11, further comprising receiving the first parameter.

13. The method according to claim 12, wherein the receiving comprises receiving the first parameter via radio resource control signaling.

14. The method according to claim 12, wherein the receiving comprises receiving the first parameter, wherein the first parameter is a parameter controlling a coverage for the downlink shared channel information.

15. The method according to claim 11, wherein the searching comprises not searching at a search position of the original search space.

16. The method according to claim 11, wherein the searching comprises searching at at least one search position not comprised in the original search space.

17. The method according to claim 16, wherein the aggregation level of the search position not comprised in the original search space is defined as m*4, m being a positive integer, including the aggregation levels of 16, 24, and 32.

18. The method according to claim 16, wherein the searching comprises searching at least two search positions having the same aggregation level, the method further comprising:

combining the entries of the at least two search positions; or decoding the entries of the at least two search positions separately.

19. The method according to claim 11, wherein both the original search space and the redefined search space are a user equipment specific search space or a common search space.

20. A computer program product comprising a non-transitory computer-readable storage medium bearing computer program code embodied therein for use with a computer, the computer program code comprising code for performing at least the following:

monitoring a first parameter comprising an information when an original search space of a downlink control channel of an orthogonal frequency division multiplex technology is redefined;

checking whether or not the first parameter indicates that the original search space is redefined; and searching an entry at a search entry of the redefined search space if the checking means checks that the original search space is redefined.

* * * * *